United States Patent
Stehle et al.

(10) Patent No.: US 7,159,040 B2
(45) Date of Patent: Jan. 2, 2007

(54) FINANCIAL SERVICE SYSTEM FOR CONVERTING AMENDMENT DATA AT AGENT TERMINAL AND A PORTAL TO GENERATE COMPATIBLE DATA FORMAT FOR TERMINALS

(75) Inventors: Klaus J Stehle, Bad Heilbrunn (DE); Piero Altomare, Rothenburg (CH)

(73) Assignee: Indatex Services for Finance and Insurance AG, Starnberg (DE)

( * ) Notice: Subject to any disclaimer, the term of this patent is extended or adjusted under 35 U.S.C. 154(b) by 691 days.

(21) Appl. No.: 09/790,113

(22) Filed: Feb. 21, 2001

(65) Prior Publication Data

US 2002/0019788 A1   Feb. 14, 2002

(30) Foreign Application Priority Data

Aug. 9, 2000   (EP) .................................. 00117096

(51) Int. Cl.
G06F 15/16 (2006.01)
(52) U.S. Cl. ...................... 709/246; 709/203
(58) Field of Classification Search ............ 705/4, 705/36 R, 35; 709/246, 208, 203; 707/201, 707/101, 9; 717/122; 704/9; 358/1.15
See application file for complete search history.

(56) References Cited

U.S. PATENT DOCUMENTS

| | | | | |
|---|---|---|---|---|
| 5,481,722 A | * | 1/1996 | Skinner | 717/122 |
| 5,689,705 A | * | 11/1997 | Fino et al. | 707/201 |
| 5,790,791 A | * | 8/1998 | Chong et al. | 709/208 |
| 5,794,218 A | * | 8/1998 | Jennings et al. | 705/35 |
| 6,347,307 B1 | * | 2/2002 | Sandhu et al. | 705/36 R |
| 6,662,186 B1 | * | 12/2003 | Esquibel et al. | 707/101 |
| 6,992,786 B1 | * | 1/2006 | Breding et al. | 358/1.15 |
| 6,993,476 B1 | * | 1/2006 | Dutta et al. | 704/9 |
| 7,054,952 B1 | | 5/2006 | Schwerdtfeger et al. | 709/246 |
| 2002/0049655 A1 | * | 4/2002 | Bennett et al. | 705/35 |
| 2002/0059235 A1 | * | 5/2002 | Jecha et al. | 707/9 |
| 2002/0120473 A1 | * | 8/2002 | Wiggins | 705/4 |

FOREIGN PATENT DOCUMENTS

| | | |
|---|---|---|
| DE | 197 23 479 A1 | 12/1998 |
| EP | 0 895 173 A2 | 2/1999 |
| WO | WO 00/28462 | 5/2000 |

* cited by examiner

Primary Examiner—Le Hien Luu
(74) Attorney, Agent, or Firm—Holland & Hart LLP

(57) ABSTRACT

A portal facilitates electronic business communication between independent agents and connected financial services providers such as terminals of insurance firms, etc. By means of a data transmission via the portal and a format conversion, all the data relevant to the preparation, arrangement, and provision of a financial service, for example of insurance firms, are handled electronically. It is thus possible to substantially dispense with paper-based manual processing of data.

13 Claims, 5 Drawing Sheets

FINANCIAL SERVICE SYSTEM FOR CONVERTING AMENDMENT DATA AT AGENT TERMINAL AND A PORTAL TO GENERATE COMPATIBLE DATA FORMAT FOR TERMINALS

FIELD OF THE INVENTION

The present invention relates to a process for electronic data transmission in association with the provision of financial services, to software programs for the implementation of such a process, and to a system for electronic data transmission in association with the arrangement of financial services.

BACKGROUND OF THE INVENTION

In the field of electronic arrangement and provision of financial services, typical financial services are offered by insurance firms, banks, stockbrokers, fund management companies, leasing firms, building societies, etc. In particular in the field of insurance-related financial services, different marketing approaches exist for the arrangement of these financial services between the actual financial services firm and the end customer. One of these marketing approaches, which has gained in significance in the course of a liberalization of the insurance industry, is that of so-called independent agents (brokers, multiple agencies, marketing companies). An agent of this kind can offer an end customer, and arrange, financial services from a number of different financial services providers (insurance firms). Typically, an independent agent has up to 30 different insurance company partners whose financial services he can make available.

In addition to this marketing approach of the independent agent, there are also exclusive agents who offer the financial services only of one specific financial services provider (insurance firm). However, the market share of this marketing approach is of diminishing significance.

A voluminous exchange of data naturally takes place between independent agents and the various insurance firms in terms of the arrangement and execution of the financial service, which exchange should actually be performed electronically. However, it must be borne in mind that on the one hand the insurance firms normally use proprietary management systems, i.e., software installations which have not been individually created and thus are largely non-uniform. On the other hand, different agents, for example for the inventory management of the independent agent. These different types of agent management software also differ from one another and are in no way standardized. It is thus true to say that at the present time no standardized electronic communication takes place between insurance companies and independent agent.

As will now be explained with reference to FIGS. 4 and 5 of the attached drawings, the situation in the present-day insurance market is such that the exchange of information between insurer and independent agent substantially takes place on the basis of paper-based manual processing.

FIG. 4 shows in particular that independent agents who offer a large number of insurance companies to end customers provide for a virtually arbitrary number of communications channels.

The paper-based manual processing according to the prior art will now be explained with reference to FIG. 5. When a proposal for insurance is to be made, the independent agent 3 enters the appropriate data in his agent management program 16. In parallel thereto, the proposal is manually recorded and sent in paper form (hard copy) 17 to the insurance company 1. At the insurance company, in a further manual entry step the proposal in paper form from the independent agent 3 is entered in the management program (proprietary software) 13 of the insurance company 2. This takes place using an appropriate workstation computer 15. Finally, the issued policy is sent by mail to the agent 3 who extracts the relevant data therefrom and enters it again manually in his agent management program 16.

In this way, forms are provided, supplied updated, completed and dispatched with a high outlay in terms of personnel and time on both sides, i.e., both on the part of the independent agent and on the part of the insurance company. At the respective other end, the forms are then received, distributed, checked for content and organizationally processed by independent agent and insurance company. The thus initiated and completed process must also be recorded by both parties in accordance with data technology. This paper-based manual processing has disadvantageous consequences both for the independent agent and for the insurance company. Thus, in the main business procedures of proposal processing, inventory processing, issuing of policies, calculation of brokerage/commission and settlement of claims, this technique leads to problems in the service provision process, which can be expressed by the following parameters:

low process quality due to faulty data input;
high error and complaints quotas;
long throughput times etc.

In the document and information management, this paper-based manual technique has disadvantages in terms of the supply, printing costs, and postal dispatch of forms, documents and other written documentation. This leads to a lack of customer satisfaction and high costs in the service provision process. In summary, the reasons for these disadvantages are that no standardized data formats are available in association with the multiple agency marketing approach, these are incompatible for information systems of insurance companies, and the data processing methods both of the insurance companies and of the independent agents (agent management programs) are heterogeneous. As stated above, independent agent and insurance company consequently cannot communicate with one another by electronic means (with the exception of specific 1:1 links).

SUMMARY OF THE INVENTION

The present invention makes available a technique which enables financial services firms, in particular insurance companies, and independent agents (multiple agencies), to electronically transmit all the data required for the preparation, arrangement and/or execution of the relevant financial service, even when different management programs are being used by the independent agents and/or the financial services firms, where advantageously no changes are required to internal processes of the agents or financial services providers.

Where in the following "insurance firms" are referred to, these are to serve as a clear example of financial services providers in general and are not to constitute any kind of limitation in terms of the type of financial service provision.

The invention thus facilitates an electronic communication between the financial services firms and the independent agents without the software and hardware of both parties necessarily having to be standardized. However, the data can be exchanged between the parties participating in the preparation, arrangement and/or provision of the financial service without multiple manual entries and without paper work.

In accordance with a first aspect of the present invention, a process is provided for electronic data transmission from at least one agent terminal to one of a plurality of terminals of financial services firms by means of a data network. The agent terminals in this case arrange financial services between different financial services firms and end customers. Firstly, data relevant to a financial service are input into the agent terminal. These data are then transmitted from the agent terminal to a portal which is independent of the agent terminal and of the terminal of the financial services firm. In this context a portal is a data network application and in particular an internet application implemented on a server of the data network (e.g., internet) which allows predetermined and/or arbitrary users of the data network access to the communication of information from a given and/or unlimited subject area.

Finally, the input data are transmitted from the portal into the management program of the terminal, adapted to the format required by the management program of the terminal. This also takes place via a data network (e.g., the internet).

The data input into the agent terminal can be automatically read from the management program of the agent terminal by means of a converter application, whereupon, optionally supplemented by further relevant data, they are transmitted in a standardized form to the portal. The converter application can simultaneously carry out a plausibility check.

In accordance with a further aspect of the present invention, a process is provided for electronic data transmission from one of a plurality of terminals of financial services firms to at least one agent terminal by means of a data network. In this case the agent terminals arrange services of different financial services firms with end customers. Here data relevant to a financial service are input into the management program of a terminal of the financial services firm. The input data are transmitted to a portal which is independent of the agent terminal and the terminals of the financial services firm(s). Finally, the input data are transmitted from the (e.g., internet) portal to the management program of the agent terminal, adapted to the format required by the management program of the agent terminal.

In this case the data can be transmitted in a standardized format from the management program of the terminal to the portal.

The agent management program can be installed on the agent terminal itself and/or on the portal, in which latter case the agent terminal can use the data network (internet) to access the management program and the data processed therein at the portal.

If, in the case of a data transmission between an agent terminal and a terminal of a financial services firm, it is established that the transmission addressee already has an earlier data set of the same content, not all the data, but only amended data sets are transmitted and overwritten at the addressee terminal.

Data input at one of the terminals can in each case be converted by the portal into a standardized format and from this in turn into a format adapted to the relevant output terminal. Alternatively, the data can be input in a standardized format into a management program of an agent terminal, which is particularly simple if the agent management software can be standardized.

The financial services firms can for example be insurance companies. In this case insurance tariff information and/or contract information can also be transmitted from at least one terminal of an insurance company to at least one agent terminal via the data network and the portal.

In accordance with a further aspect of the present invention, a software program is provided which, when loaded in a memory of a terminal of a financial services firm, a data network portal, and/or an agent terminal, facilitates the execution of a process as previously described.

The software program can be an agent management program installed on an agent terminal and/or an agent management program installed on a data network portal.

A further aspect of the present invention provides a system for electronic data transmission between an agent terminal and terminals of a plurality of financial services firms via a data network. Here the system comprises at least one agent terminal for the input and output of data relevant to a financial service by an agent who arranges financial services of different financial services firms. The data relevant to the financial services can relate to the commission and/or execution of the financial service. Additionally, a plurality of terminals, each assigned to one of the financial services firms, are provided for the input and output of the data relevant to the financial service, these terminals being operated for example by users of the relevant financial services firm. Finally a portal is provided for transmitting the data between the at least one agent terminal and the terminal of the financial services firm with the relevant input format adapted to the relevant output format, the data transmission taking place via a data network.

The financial services firms can be insurance companies. In this case insurance-relevant data such as proposal data, inventory data, policy data, brokerage/commission data and/or claims data, can be transmitted.

BRIEF DESCRIPTION OF THE DRAWINGS

Further advantages, features, and characteristics of the present invention will become apparent from the following detailed description of an exemplary embodiment, making reference to the figures of the accompanying drawings in which.

DETAILED DESCRIPTION OF THE INVENTION

Figure 1:
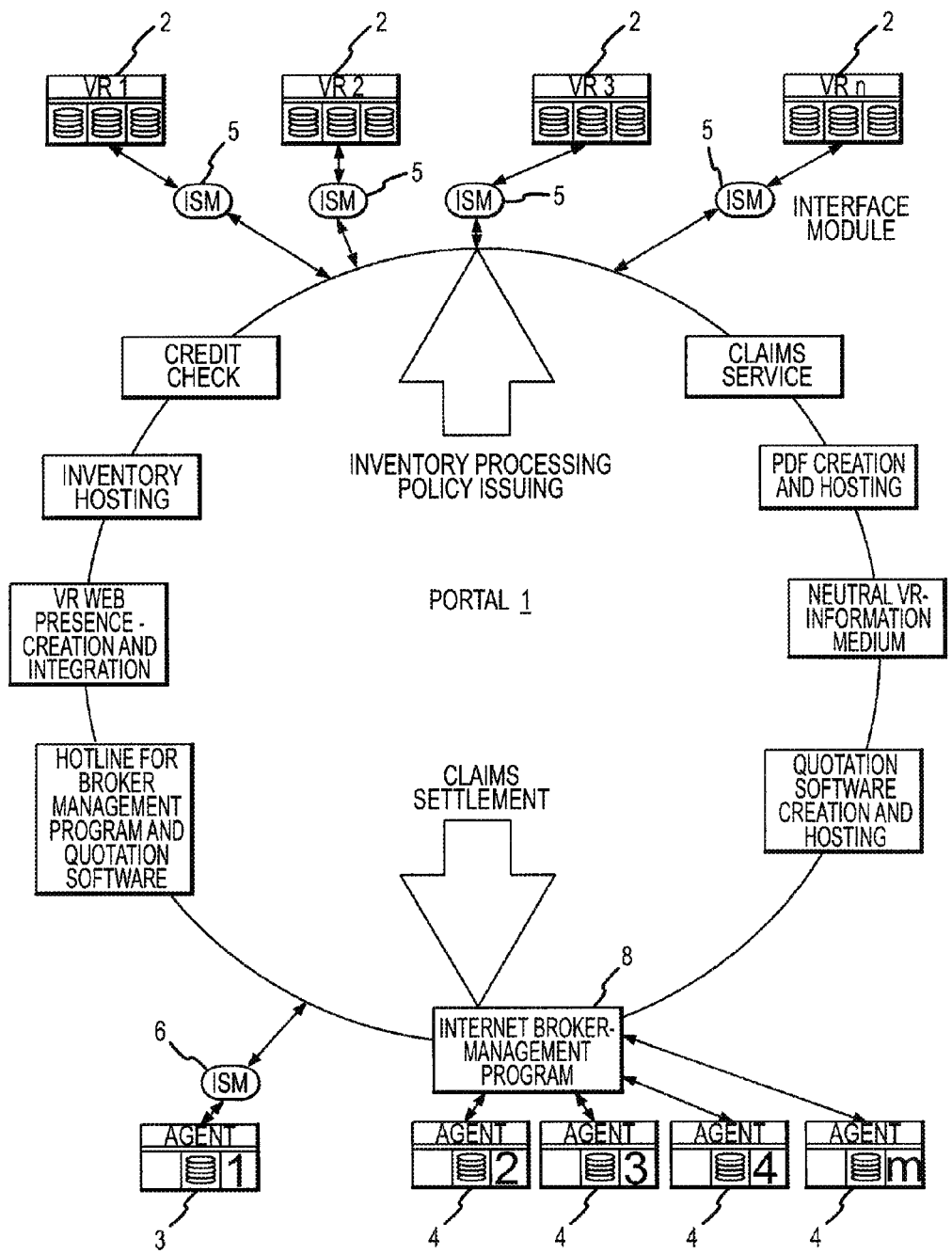
FIG. 1 is an overview of a system for electronic data traffic between financial services firms and independent agents according to the present invention.

An overview of the system according to the invention will now be given with reference to FIG. 1. Here different financial services providers (insurance firms) VR1, VR2 . . . VR(n) have been designated by the reference symbol 2. These are in each case connected by an interface module (ISM) 5 to a portal 1, whereby an interface module 5 is provided for each linked financial services provider. The various interface modules 5 are individually configured in accordance with the software of the associated financial services provider and therefore generally differ from one another according to the software of the associated financial services provider.

The physical transmission medium here can consist of a data network, such as for example the internet. The portal 1 has, in particular, an electronic transmission function comprising format adaptation for the most important procedures in the insurance industry, such as the completion of proposals, inventory processing, policy issuing, brokerage/commission calculation, and claims settlement. Additionally, an exchange of data and information relating to the following services can also take place via the portal 1:

credit checking;
inventory hosting;
creation and integration of a web presence for insurance firms;
provision of a hotline (information telephone line) for an agent management program and quotation software;
quotation software creation and hosting;
a function as neutral insurance information medium;
the creation and hosting of forms in a standardized format (for example the PDF format); and
claims service.

The portal 1 is also connected by interface modules 6 to independent agents or broker 3. Here each independent agent 3 is provided with an interface module 6 adapted to the agent management program in his terminal.

In the event that agents 4 wish to use their own agent management program installed on their terminal, the portal 1 can comprise an agent or broker management program 8 for these agents 4 which can be operated via the internet, the agents 4 being able to access this internet agent management program 8 via a data network (the internet). This will be explained in detail later making reference to FIG. 2.

Figure 2:
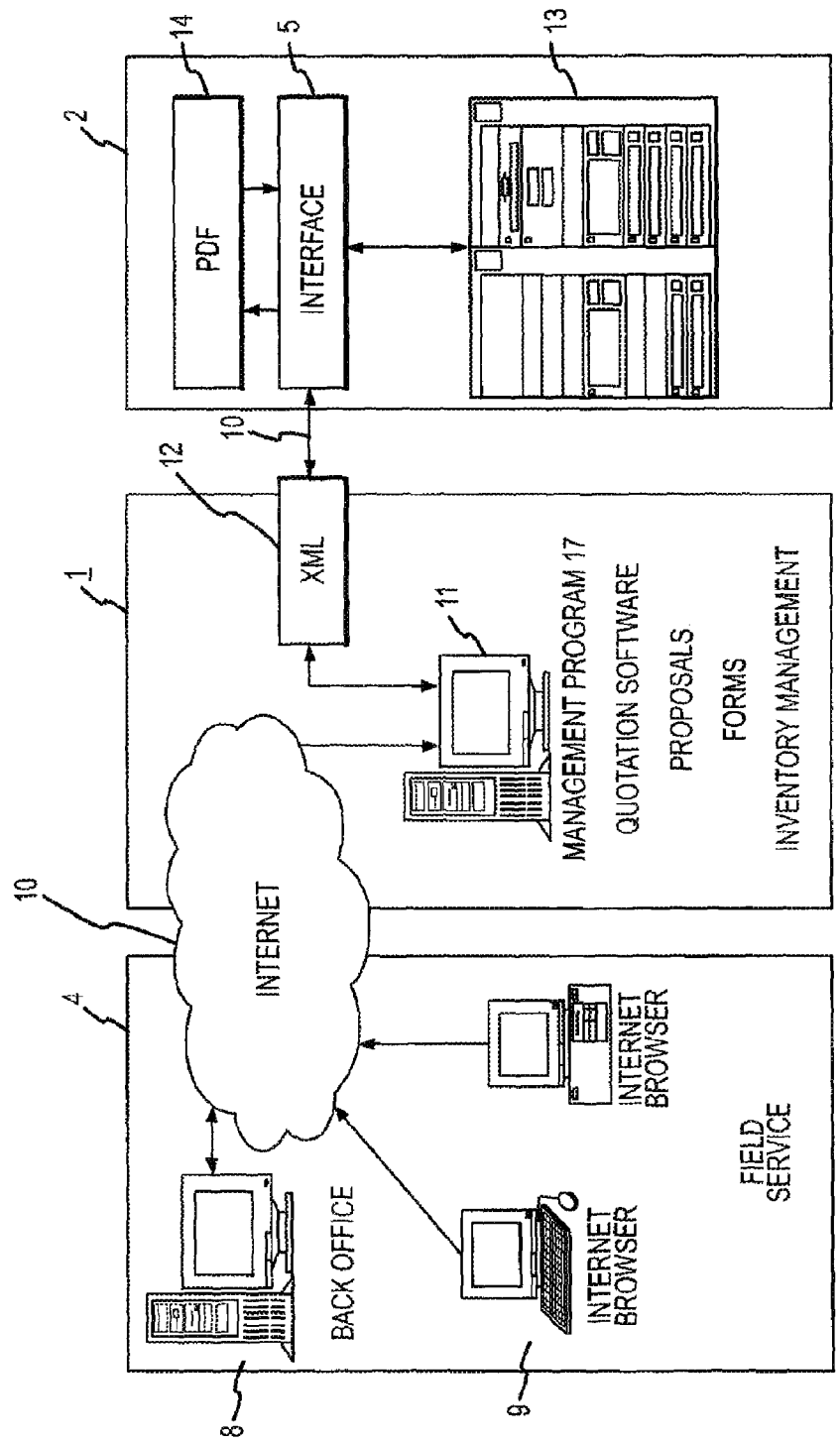
FIG. 2 is a diagram of a scenario in which the agent management software is stored and implemented on a portal.

FIG. 2 illustrates a scenario for agent terminals 4 which do not have their own agent management program installed. In this case the agent terminal 4 can for example comprise the back office 8, i.e., the corresponding, permanently installed computer and mobile computers (laptop or notebook computer) 9 for use on field service. These computers 8 and 9 assigned to the agent terminal 4 are connected via the internet 10 to the portal 1. In addition to the actual portal-related software, an agent or broker management program 17 is also stored on a server 11 linked to the internet 10. This agent management program 17 stored on the server 11 of the portal 1 handles, for example, the following aspects: quotation software, proposals, forms, inventory management, etc. For this purpose the corresponding connected agent terminals 4 access this agent management program 17 via the internet 10.

On the other hand, the portal 1 is connected via a XML interface 12 to an interface 5. The interface 5 is assigned to the terminal 2 of the financial services company (insurance). The terminal 2 of the financial services company also comprises a server 13. The interface 5 of the terminal 2 can, for example, convert each document input by the server 13 of the terminal 2 into a standardized format, such as the PDF format 14. The PDF format 14 may be created and managed by the commercially available program Acrobat of the company Adobe.

In the scenario according to FIG. 2, data inputs at the agent terminal 4 automatically possess a standard format as they access a standard agent management program 17 at the portal 1. The interface 5 of the terminal 2 of the financial services firms then ensures that the data are transmitted in standard format from the portal 1 into the management software of the terminal 2 which is installed on the server 13, in an appropriately adapted form and optionally with format conversion.

Figure 3:
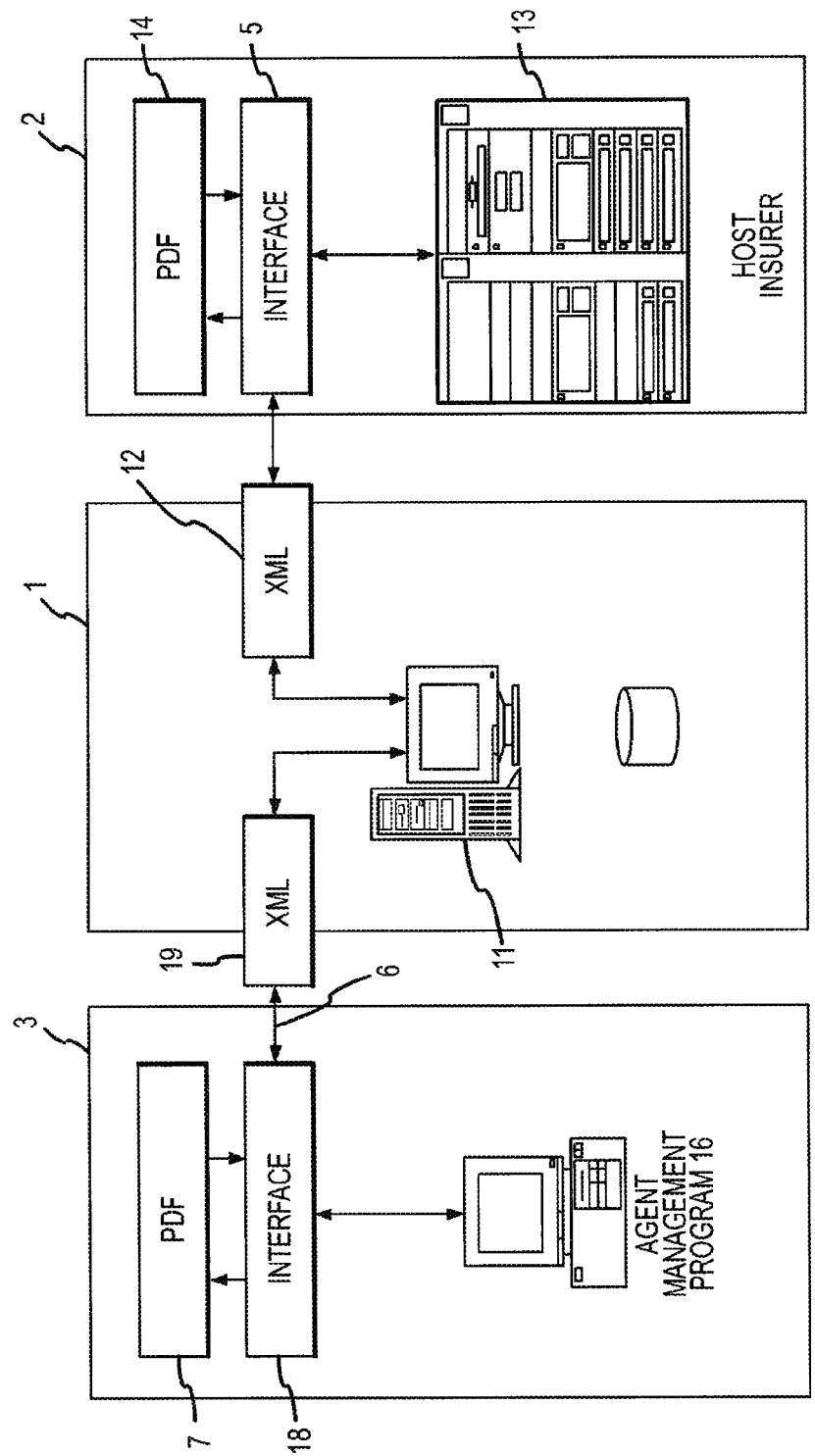
FIG. 3 illustrates a scenario in which the agent management software is installed at the terminal of the independent agent.
Figure 4:
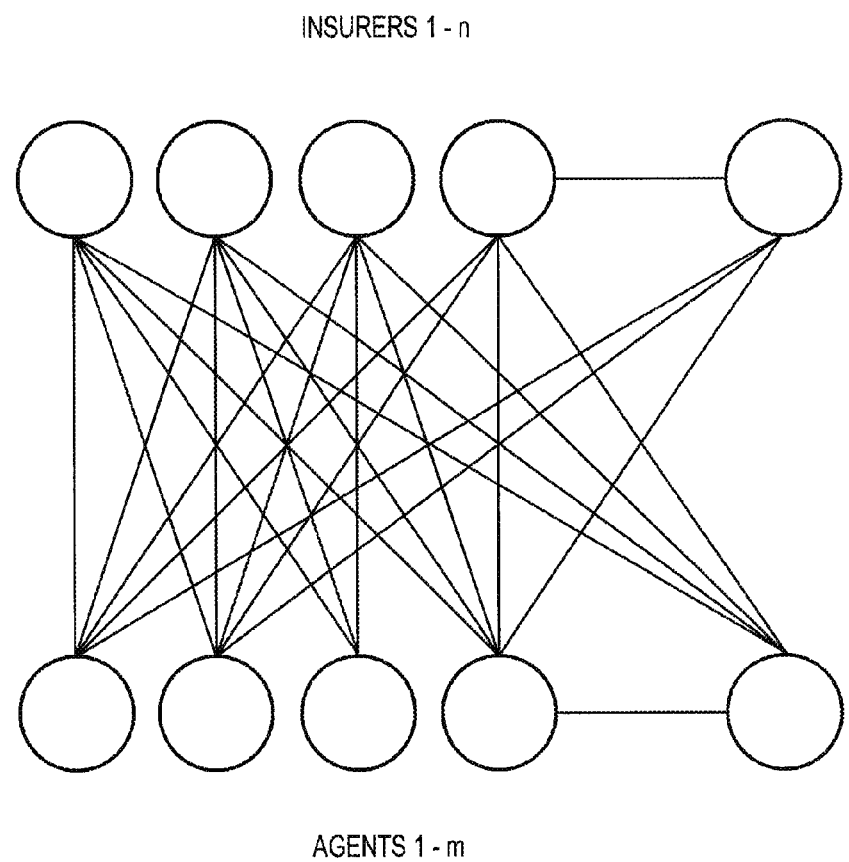
FIG. 4 schematically illustrates the communication channels between different insurance companies and independent agents.
Figure 5:
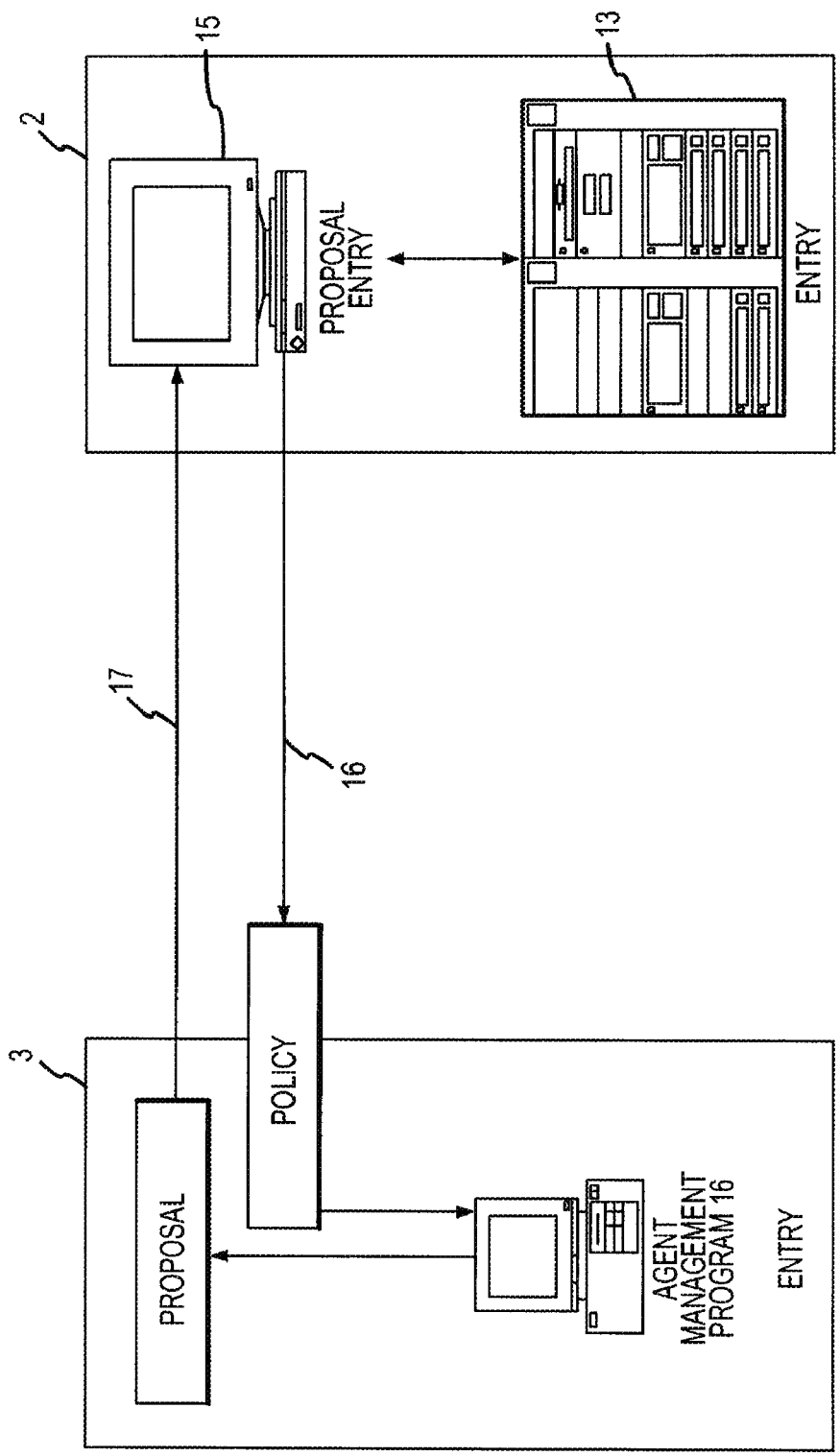
FIG. 5 shows the paper-based manual data transmission between independent agents and insurance companies according to the prior art.

FIG. 3 illustrates the scenario in which an agent or broker management program 16 is installed on the agent terminal 3 itself. In this case a conversion program 18 is added to the agent management program 16, by which conversion program data input by means of the agent management program 16 are converted into a standardized format, such as for example the PDF format 7. Then a data transmission takes place from the conversion module 18 to the portal 1 by means of a XML interface 19. In this case, where the agent management program 16 is installed as stated on the agent terminal 3, the portal 1 substantially has a communication function from one of the plurality of agent terminals 3 to the corresponding terminal 2 of the required insurance company. The data input into the agent terminal 3 can thus be automatically read out from the management program 16 of the agent terminal 3 by the converter application whereupon, optionally supplemented by further relevant data, it is transmitted to the portal 1 in standardized form via an interface module 6.

In the case of a data transmission from the terminal of an insurance company to an agent terminal 3, several options exist in the scenario illustrated in FIG. 3. On the one hand, the data transmitted in standardized form via the portal 1 to the agent terminal 3 can be automatically input into the agent management program of the agent terminal 3 by the converter application installed therein. Alternatively, the converter application can make available the data in the agent terminal 3 in a standardized format (e.g. the PDF format) for viewing and print-out etc., in which case a possibly desired data transfer into the agent management program must be performed manually.

Naturally a mixed form of the examples illustrated in FIGS. 2 and 3 is also possible, i.e., an exemplary embodiment in which the agent management program is implemented at the agent terminal and at the portal.

In this way, by means of the invention, data relevant to the preparation and/or provision of financial services can be electronically exchanged between an independent agent and a financial services firm. For example, such data occurs in proposal processing, policy issuing, inventory processing, claims settlement, and brokerage/commission calculation by insurance firms.

The portal 1 also makes forms available in a standard format such as PDF (portable document format). For each type of contract there is a proposal, a policy, and a claims form as well as the forms and documents commonly used by insurance companies/agents (e.g., cover notes). The proposal and claims form here can possess a built-in "intelligence", i.e., the portal 1 can at least partially automatically perform a plausibility check on the data input into the proposal and the claim form by the agent terminal 3. If this plausibility check detects a possible (input) error, this can be displayed on the agent terminal 3 and/or the further input of data can be denied until the possible error has been eliminated and/or expressly confirmed as an intentional input. The plausibility check can take place, for example, in PDF format.

Furthermore, the proposal can be equipped with an automatic tariff calculator. In this case the portal also comprises tariff information from the linked insurance companies.

For the independent agents, the following advantages are achieved in respect of the process quality:

reduction in throughput times;
reduction in error quotas;
reduction in complaints processing.

Additionally, for the independent agents, an efficient service provision is ensured as a result of the following advantages:
lower policy issuing costs;
lower inventory processing costs;
lower claims settlement costs;
elimination of redundant data input.

Furthermore, the electronic access to forms/documents ensures improved information and document management via a standard interface (portal) for the insurance industry. Additionally, an agent management program which can run on the internet is made available to the independent agents.

The financial services companies have the following advantages in respect of the process quality:
reduction in throughput times;
reduction in error quotas,
reduction in complaints processing.

The financial services providers (insurance firms) have the following advantages in respect of the service provision:
lower policy issuing costs;
lower inventory processing costs;
lower claims settlement costs;
elimination of redundant data input.

The insurance companies have the following benefits in respect of an efficient information and document management:
reduction or elimination of postage and dispatch costs;
reduction or elimination of printing and supply costs;
reduction or elimination of copying and installation costs for quotation software;
effective information management by professional internet presentation.

The conversion application 18 thus reads out data which have been input into the agent management program and converts said data into an insurance-specific form format. In this way for example an insurance proposal can be completed electronically by an independent agent. The data transmission can take place on-line, i.e., the data input in the agent management program are directly available at the portal and are transmitted either immediately or at a given time to the associated insurance company. Alternatively or additionally, an off-line input can take place, i.e., for example in field service the data are input into the agent management program of the portable computer of the field service worker. As soon as this computer can then establish an on-line connection to the portal 1 and thus also to the corresponding insurance company, the data are read out from the agent management program and converted into the insurance-specific format.

In the event that the agent management program is installed on the portal 1, the agent terminal also requires a browser function. (A browser is a display program for searching through the world wide web (www) on the internet; a browser program graphically displays the www information for viewing and permits the selection of different services such as HTTP, XML etc.) The actual inventory software in this case is stored on the portal 1.

Fundamentally, in the present invention it is the case that only amendment data are transmitted, but never entire data sets. In other words, in the event that the transmission addressee already has an earlier data set of the same content, only the amended data are transmitted and entered or overwritten at the transmission addressee terminal, thereby saving network resources.

What is claimed is:

1. A process for transmitting electronic data between at least one agent terminal to one of a plurality of terminals of financial services firms by means of a data network, wherein the agent terminals in each case arrange services of different financial services firms with end customers and wherein the process comprises:
inputting data relevant to a financial service at the agent terminal;
identifying from the input data amendment data that has changed;
automatically converting the amendment data at the agent terminal into a standardized form;
transmitting the amendment data in the standardized form to a portal which is independent of the agent terminal and of the financial service firm terminal;
translating the amendment data at the portal into a format compatible with a management program of the financial service firm terminal;
transmitting the translated amendment data from the portal to the management program of the financial service firm terminal;
receiving amendment data from the management program of the financial service firm terminal at the portal;
translating the received amendment data at the portal into a format compatible with the agent terminal; and
transmitting the received amendment data from the portal to the agent terminal, wherein only amendment data is sent to conserve network resources.

2. A process as claimed in claim 1, wherein a management program is installed on the agent terminal.

3. A process as claimed in claim 1, wherein a management program which can be accessed by the agent terminal via the data network is installed on the portal.

4. A process as claimed in claim 1, further comprising converting data input at the agent terminal into the standardized format before the step of translating the input data into a format compatible with the management program of the financial service firm terminal.

5. A process as claimed in claim 1, further comprising transmitting insurance-relevant information from at least one agent terminal to at least one financial service firm terminal via the data network and the portal.

6. A system as claimed in claim 1, wherein the amendment data comprises all the input data.

7. A process for transmitting electronic data between one of a plurality of terminals of financial services firms to at least one agent terminal by means of a data network, wherein the agent terminals in each case arrange services of different financial services firms with end customers and wherein the process comprises:
inputting data relevant to a financial service into a management program of a terminal of the financial services firm;
identifying from the input data amendment data that has changed;
transmitting the amendment data to a portal which is independent of the agent terminal and of the financial service firm terminals;
translating the amendment data at the portal to a standardized format;
transmitting the amendment data in the standardized format from the portal to the agent terminal for display in the standardized format;
receiving amendment data in the standardized format from the agent terminal at the portal;
translating the received amendment data at the portal from the agent terminal into a format compatible with the management program of the financial service firm terminal; and transmitting the translated received amendment data to the management program of the financial service firm terminal.

8. A process as claimed in claim 7, further comprising:
transmitting the data from the portal to a format converter application; and
automatically entering the data into an agent management program via the converter application.

9. A process as claimed in claim 8, wherein the step of translating the input data into the standardized format occurs prior to transmitting the input data to the portal.

10. A process as claimed in claim 7, wherein the step of translating the input data into the standardized format occurs prior to transmitting the input data to the portal.

11. A process as claimed in claim 7, further comprising converting data input at the financial service firm terminal into a standardized format; and
converting the standardized data into a format adapted for the agent terminal.

12. A process as claimed in claim 7, further comprising transmitting insurance-relevant information from at least one financial service firm terminal to at least one agent terminal via the data network and the portal.

13. A system as claimed in claim 7, wherein the amendment data comprises all the input data.

* * * * *